United States Patent
Hansen

(10) Patent No.: US 8,065,537 B2
(45) Date of Patent: Nov. 22, 2011

(54) ADJUSTING CAP SETTINGS OF ELECTRONIC DEVICES ACCORDING TO MEASURED WORKLOADS

(75) Inventor: Peter A. Hansen, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 802 days.

(21) Appl. No.: 12/110,575

(22) Filed: Apr. 28, 2008

(65) Prior Publication Data

US 2009/0187783 A1    Jul. 23, 2009

Related U.S. Application Data

(60) Provisional application No. 60/943,392, filed on Jun. 12, 2007.

(51) Int. Cl.
*G06F 1/00* (2006.01)
(52) U.S. Cl. .................................................... 713/300
(58) Field of Classification Search .................. 713/300
See application file for complete search history.

(56) References Cited

U.S. PATENT DOCUMENTS

| | | | |
|---|---|---|---|
| 5,655,120 A | 8/1997 | Witte et al. | |
| 6,128,657 A | 10/2000 | Okanoya et al. | |
| 6,263,368 B1 | 7/2001 | Martin | |
| 6,327,622 B1 | 12/2001 | Jindal et al. | |
| 6,941,480 B1 * | 9/2005 | Dai | 713/320 |
| 7,032,037 B2 | 4/2006 | Garnett et al. | |
| 7,536,569 B2 * | 5/2009 | Montero et al. | 713/300 |
| 2003/0125886 A1 | 7/2003 | Spitaels et al. | |
| 2003/0135767 A1 | 7/2003 | Chu et al. | |
| 2004/0117536 A1 | 6/2004 | Franke et al. | |
| 2004/0268157 A1 | 12/2004 | Dake et al. | |
| 2004/0268166 A1 * | 12/2004 | Farkas et al. | 713/320 |
| 2005/0102676 A1 | 5/2005 | Forrester | |
| 2005/0138440 A1 * | 6/2005 | Barr et al. | 713/300 |
| 2005/0257213 A1 | 11/2005 | Chu et al. | |
| 2005/0289362 A1 | 12/2005 | Merkin et al. | |
| 2005/0289376 A1 | 12/2005 | Hartman et al. | |
| 2006/0010353 A1 | 1/2006 | Haugh | |
| 2006/0072269 A1 | 4/2006 | Staples | |
| 2006/0112286 A1 | 5/2006 | Whalley et al. | |
| 2006/0129675 A1 | 6/2006 | Zimmer et al. | |
| 2006/0149985 A1 | 7/2006 | Dubinsky | |
| 2006/0190745 A1 * | 8/2006 | Matsushima et al. | 713/300 |
| 2006/0282685 A1 | 12/2006 | Bahali et al. | |
| 2006/0282688 A1 | 12/2006 | Bahali et al. | |
| 2007/0047195 A1 | 3/2007 | Merkin et al. | |
| 2007/0050644 A1 | 3/2007 | Merkin | |
| 2007/0180280 A1 | 8/2007 | Bolan et al. | |

FOREIGN PATENT DOCUMENTS

WO    W09932956 A2    7/1999

OTHER PUBLICATIONS

P.A. Hansen et al., U.S. Appl. No. 12/107,999, entitled "Adjusting a Cooling Device in a Server in Response to a Thermal Event," filed Apr. 23, 2008, pp. 1-18, Fig. 1-2.

* cited by examiner

*Primary Examiner* — Mark Connolly

(57) ABSTRACT

Workload of electronic devices in an electronic device enclosure is measured. Cap settings of the electronic devices are adjusted according to the measured workload to perform resource balancing.

19 Claims, 4 Drawing Sheets

ADJUSTING CAP SETTINGS OF ELECTRONIC DEVICES ACCORDING TO MEASURED WORKLOADS

CROSS-REFERENCE TO RELATED APPLICATION

This claims the benefit under 35 U.S.C. §119(e) of U.S. Provisional Application Ser. No. 60/943,392, entitled "Measuring and Using Amperage Load of an Individual Server Blade as Input Into a Load Balancing Algorithm for Electrical Capping of Server Blades," filed Jun. 12, 2007, which is hereby incorporated by reference.

BACKGROUND

For enhanced space efficiency while achieving increased processing power, server enclosures (e.g., cabinets, racks, etc.) capable of receiving multiple servers (e.g., such as in the form of server blades) are used. A server enclosure can have multiple slots or other mounting mechanisms to receive corresponding servers.

A concern of a server enclosure that can include a large number of servers is efficient usage of resources (e.g., power resources, cooling resources, etc.). Conventionally, all servers are assumed to have access to a full allocation of resources at all times. What this means is that the designer of the server enclosure has to plan for the possibility of all servers using the full allocation of resources. As a result, the server enclosure would have to be provided with sufficient resources to accommodate the possibility of full usage of resources, even though the servers may not actually use (and most of the time are unlikely to use) the full allocation of resources. Such a design would be inefficient, as the server enclosure would be provided with power and cooling resources that exceed what would likely be used during typical operations.

BRIEF DESCRIPTION OF THE DRAWINGS

Some embodiments of the invention are described, by way of example, with respect to the following figures.

DETAILED DESCRIPTION

Figure 1:
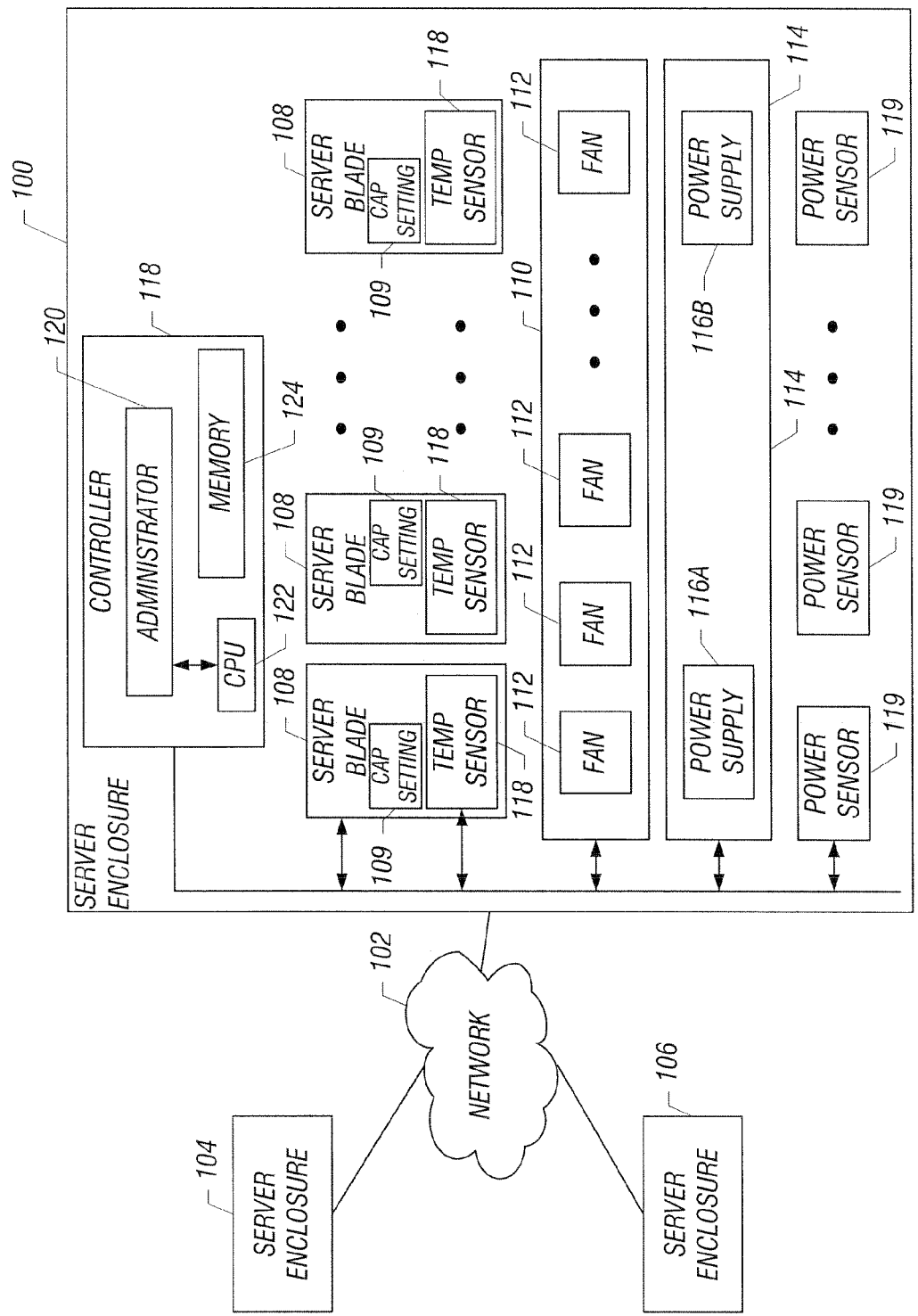
FIG. 1 is a block diagram of an example arrangement of server enclosures where at least one of the server enclosures incorporate components according to an embodiment.

In accordance with some embodiments, a resource load balancing technique or mechanism is provided to measure workload of electronic devices in an electronic device enclosure. To perform resource load balancing in usage of resources of the electronic device enclosure, cap settings of the electronic devices are adjusted according to the measured workloads. An "electronic device enclosure" refers to any structure, such as a cabinet, rack, and so forth, that defines a space to receive multiple electronic devices. Examples of electronic devices include server computers (or simply servers), switch modules, communications modules, storage devices, and so forth. The electronic device enclosure has slots or other mounting mechanisms to receive the electronic devices.

The resources of the electronic device enclosure include power resources (e.g., one or more power supplies), cooling resources (e.g., fans, air conditioning units, etc.), or other resources. A "cap setting" refers to a maximum electrical consumption level, which can be expressed in terms of wattage, electrical current, and so forth, that an electronic device is allowed to consume. Each cap setting is stored as a value in a corresponding electronic device.

An initial a cap setting is assigned to each electronic device, where the cap settings can be different for different electronic devices in the electronic device enclosure. If the workload of a particular electronic device (e.g., a measured current draw or other indication of workload) causes the particular electronic device to reach or come close to (within some predefined threshold of) the assigned cap setting (e.g., measured current draw reaches or comes close to a predefined electrical current cap or electrical power cap), the cap setting of the particular electronic device can be adjusted upwardly to allow for the increased workload. To balance usage of resources, the cap setting of another electronic device with a relatively low workload can be adjusted downwardly. The general process above can be iteratively performed on a continual basis to perform resource load balancing.

Adjusting the cap settings of the various electronic devices allows for an intelligent distribution of power or cooling resources based on workloads of the corresponding electronic devices. In other words, power and/or cooling resources can be provided to electronic devices that have higher workloads (and thus higher cap settings), while a reduced amount of power and/or cooling resources can be distributed to electronic devices having lower workloads (and therefore lower cap settings).

In addition, the continual adjustment of cap settings allows for efficient delivery of cooling to different parts of the electronic device enclosure. A cooling subsystem in the electronic device enclosure can include multiple cooling devices, where some of the cooling devices can have their outputs adjusted upwardly to provide additional cooling to electronic devices that have higher cap settings (higher workloads), and where other cooling devices can have their outputs reduced to deliver less cooling to electronic devices having lower cap settings (lower workloads). By adjusting distribution of cooling resources according to workloads of electronic devices, the cooling subsystem can be run more efficiently such that power is not wasted by unnecessarily running certain cooling devices at high settings for electronic devices having low workloads.

In the ensuing discussion, reference is made to a "server enclosure," which is an enclosure to receive multiple servers. Note, however, that the same or similar techniques can be applied to enclosures for other types of electronic devices.

FIG. 1 illustrates example components of a server enclosure 100, which has an outer housing defining a chamber (or multiple chambers) for housing server components. Note that the server enclosure 100 can be connected to a data network 102, which is further connected to other server enclosures 104 and 106. The server enclosures 104 and 106 can have similar components as the server enclosure 100, or alternatively, the server enclosures 104 and 106 can have different components.

The server enclosure 100 includes a number of servers 108, which can be in the form of server blades. A server blade includes a thin, modular chassis housing that contains components such as processors, memory, network controllers, and input/output (I/O) components. The server blade provides processing power in a smaller amount of space. The server blades can be mounted in corresponding slots or other mounting mechanisms in the server enclosure 100.

The server enclosure 100 also includes a cooling subsystem 110, which includes a number of fans 112 or other types of cooling devices (e.g., air conditioning units, etc.). The outputs of the fans 112 can be adjusted to provide different levels of cooling. For example, the revolutions per minute (RPMs) of fans can be adjusted to provide different air flow rates to achieve different cooling targets. The server enclosure 100 also includes a power subsystem 114, which can contain one or more power supplies 116A, 116B. In one implementation, the power supplies 116A, 116B are redundant power supplies, where one power supply can take over for the other power supply in case of failure of the other power supply.

Generally, within the server enclosure 100, the server blades 108 share a common cooling subsystem (110) and a common power subsystem (114).

The server blades 108 also include corresponding temperature sensors 118 for detecting temperatures in the server blades. Each sever blade 108 can have one or multiple temperature sensors. Although not depicted, there may also be temperature sensors outside the server blades. Moreover, the server enclosure 100 can also include power sensors 119 to detect power consumption by different parts of the server enclosure 100. The power sensor 119 can be, for example, a current sensor.

Each server blade 108 also includes a storage element 109 (e.g., register, buffer, etc.) to store a cap setting (or plural cap settings). As noted above, a cap setting refers to the maximum electrical consumption level of the server blade (in other words, the server blade is not allowed to consume electrical power or current in excess of the cap setting). In some implementations, the storage element 109 can also store a maximum cap setting and a minimum cap setting (where the maximum cap setting specifies a value above which the cap setting cannot be set higher than, and where the minimum cap setting specifies a value below which the cap setting cannot be set lower than).

The server enclosure 100 further includes a controller 118 that performs management tasks with respect to the components of the server enclosure 100. The controller 118 is able to communicate with the server blades 108, cooling subsystem 110, power subsystem 114, temperature sensors 118, and power servers 119 over one or more internal buses of the server enclosure 100.

The controller 118 includes an administrator 120, which can be a software module (or collection of software modules) executable on one or more central processing units (CPUs) 122 that is (are) connected to memory 124. The administrator 120 can handle thermal or power events within the server enclosure 100, in accordance with some embodiments.

The controller 118 (and more specifically the administrator 120) is able to monitor power consumption by the server blades 108 (using the power sensors 119, for example). The power consumption can be indicated by the current draw of the server blades 108. Alternatively, other indications of workload by other types of sensors can be used. The administrator 120 is able to receive measurement data collected by the sensors. The measurement data provides indications of workloads of the server blades.

Depending on the measured workload indications, the administrator 120 is able to adjust the cap settings of the server blades 108 to perform balancing of power and thermal resources delivered to different parts of the server enclosure 100 that contains corresponding server blades. By increasing a cap setting, the administrator 120 effectively causes an increased amount of power to be delivered from the power subsystem 114 to the corresponding server blade(s). On the other hand, by reducing a cap setting of a server blade, the administrator 120 effectively causes the power subsystem 114 to deliver less power to such server blade. Also, increasing cap settings of server blades causes more cooling resources to be delivered to such server blades, such as in the form of increased fan speeds of fans that cause air flow in regions that contain such server blades. On the other hand, reducing a cap setting of a server blade causes a reduced amount of cooling resource to be delivered to such server blade.

By efficiently load balancing power and cooling resources, enhanced efficiency is provided in the server enclosure 100. Potentially, less power can be used while not sacrificing performance of any of the server blades. Also, less power consumption occurs if outputs of certain cooling devices can be reduced due to reduced workloads of server blades. As a result, more blade servers can operate with less power and cooling resources. Workload on the server blades can shift back and forth with no performance penalties, and with realized power savings.

Figure 2:
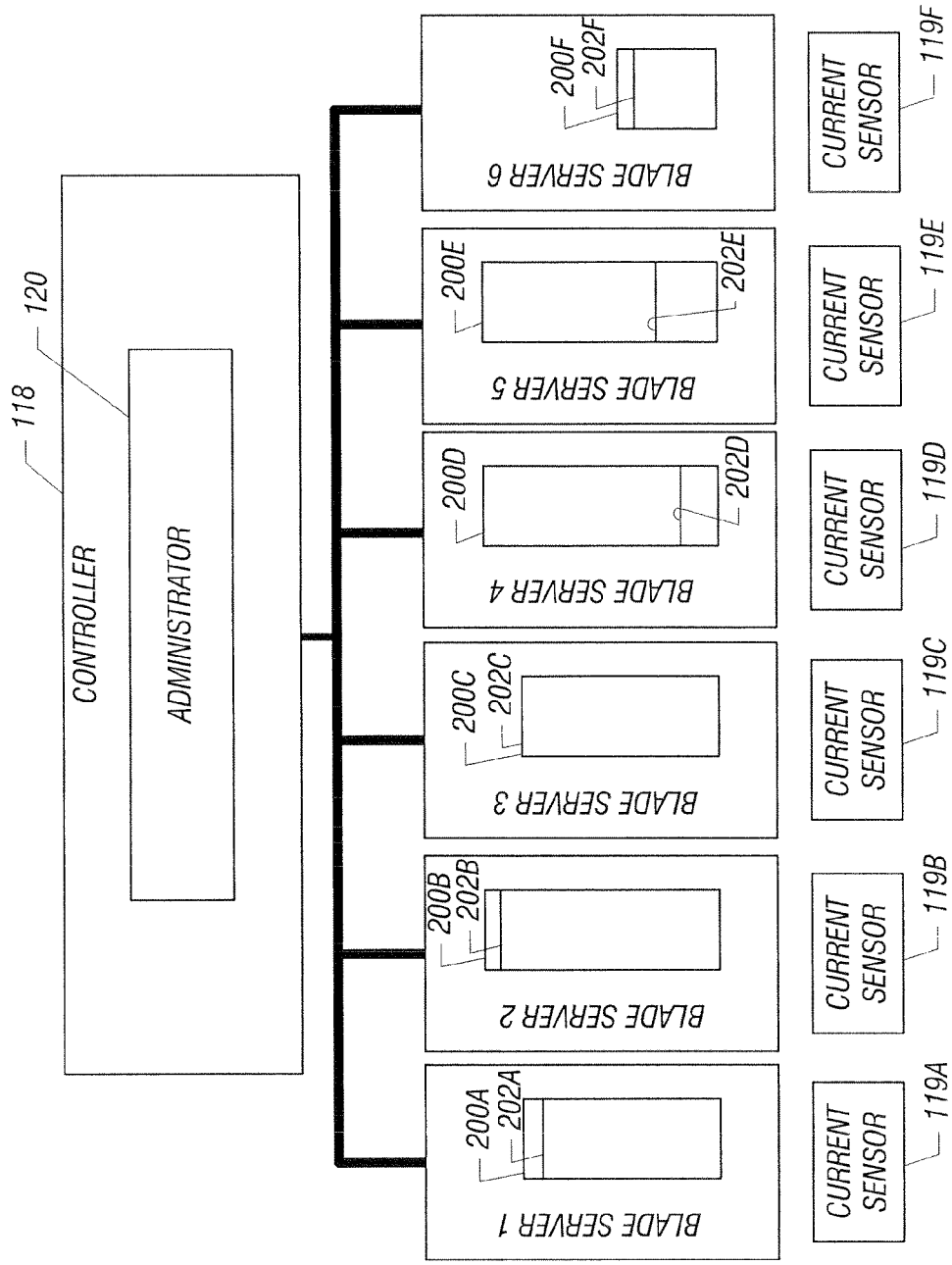
FIG. 2 illustrates different cap settings for different servers in a server enclosure, according to an embodiment.

FIG. 2 shows an example that includes a number of server blades (1-6) that are coupled to the controller 118. As illustrated in FIG. 2, each of the server blades has a respective cap setting (cap setting 200A for server blade 1, cap setting 200B for server blade 2, cap setting 200C for server blade 3, cap setting 200D for server blade 4, cap setting 200E for server blade 5, and cap setting 200F for server blade 6). As depicted, the cap settings for the different server blades can be different.

Moreover, each server blade has a current draw (represented as 202A, 202B, 202C, 202D, 202E, and 202F, respectively). The current draw can be measured by respective current sensors 119A-119F.

In the example of FIG. 2, the measured current draw 202C of server blade 3 is equal to the cap setting 200C, which means that the administrator 120 may increase the cap setting 200C of the server blade 3 to allow for increased workload to be run on server blade 3. Note also that the measured current draws 202A, 202B, and 202F of servers 1, 2, and 6 are relatively close to the cap settings 200A, 200B, and 200F, respectively. These corresponding server blades can also be candidates for increasing cap settings.

On the other hand, the measured current draws 202D and 202E of servers 4 and 5 are much less than the cap settings 200D and 200E, respectively. The cap settings 200D and 200E for server blades 4 and 5 are therefore candidates for reduction in the resource load balancing procedure used by the administrator 120.

For example, if the cap setting 200B has to be increased due to increased workload of blade server 2, then the resource balancing procedure can reduce the cap setting 200D or 200E for blade server 4 or 5 to account for the increased cap setting of blade server 2. Note that if sufficient power and/or cooling resources are available, then an increased cap setting for one blade server does not have to result in decreased cap setting of another blade server. However, in some embodiments, such balancing is performed anyway to enhance efficiency of operations of the server enclosure 100.

Figure 3:
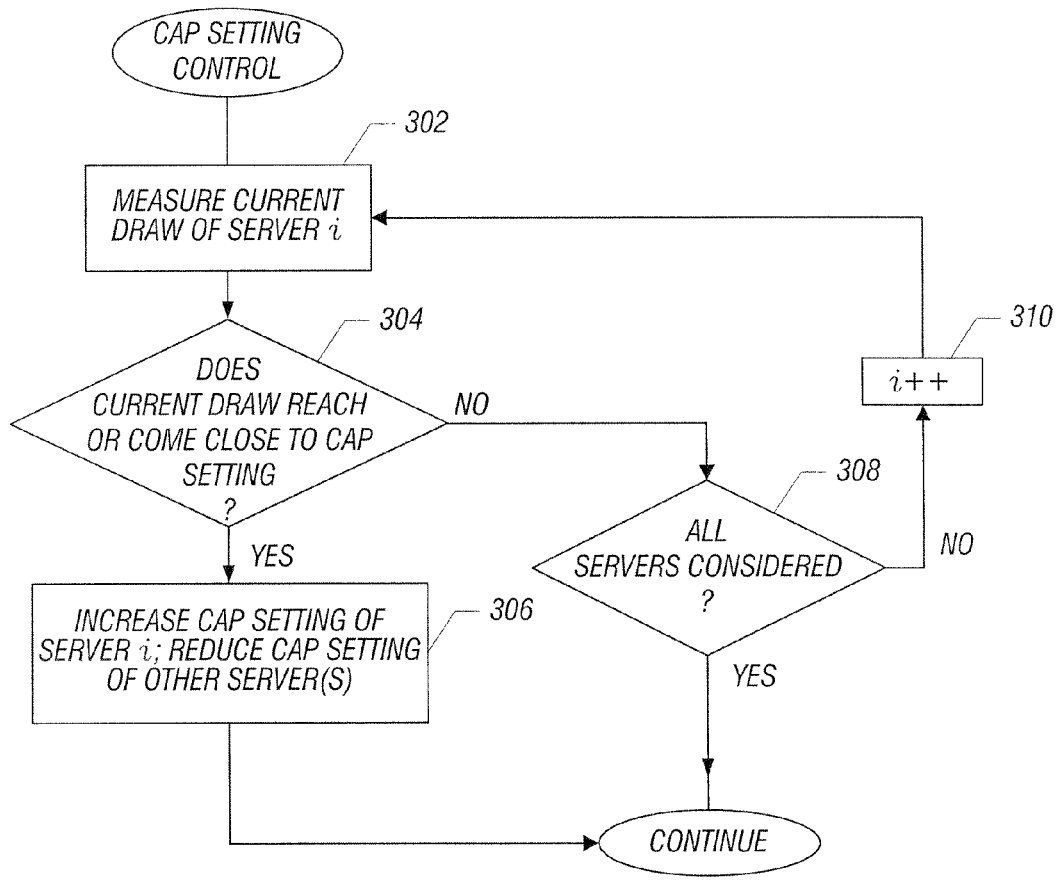
FIG. 3 illustrates a process of adjusting cap settings for servers, according to an embodiment.

A cap setting control procedure, as performed by the administrator 120, is depicted in FIG. 3. The cap setting control procedure is iteratively performed for each of the server blades in the server blade enclosure 100. This iterative procedure uses a variable i that increments through values corresponding to the different server blades through successive iterations.

The cap setting control procedure, as performed by the administrator 120 in some embodiments, measures (at 302)

the current draw for server blade i, which can start at 1 or some other predefined value. The cap setting control procedure next determines (at 304) if the current draw of server i reaches or comes close to (within a predefined threshold of) the cap setting for server i. If so, the procedure increases (at 306) the cap setting of server i, if possible. Note that in some cases, increasing the cap setting of a server is not possible since making such an increase would cause the maximum power level that can be provided by the power subsystem 114 to be exceeded. In such scenarios, the cap setting of another server would have to be reduced to allow for the cap setting of this server to be increased. Adjusting (increasing or decreasing) the cap setting of a server can be accomplished by sending a message or request (from the administrator 120 to the server), where the message or request contains an indication of a new cap setting for the server.

If it is determined (at 304) that the current draw does not reach or come close to the cap setting, then the cap setting is left unchanged, and the cap setting control procedure determines (at 308) if all servers have been considered. If not, the variable i is incremented (at 310), and the process repeats.

If all servers have been considered, then the cap setting control procedure continues. The cap setting control procedure as depicted in FIG. 3 can be repeated at a later time, such as on a periodic basis or in response to predefined events.

Figure 4:
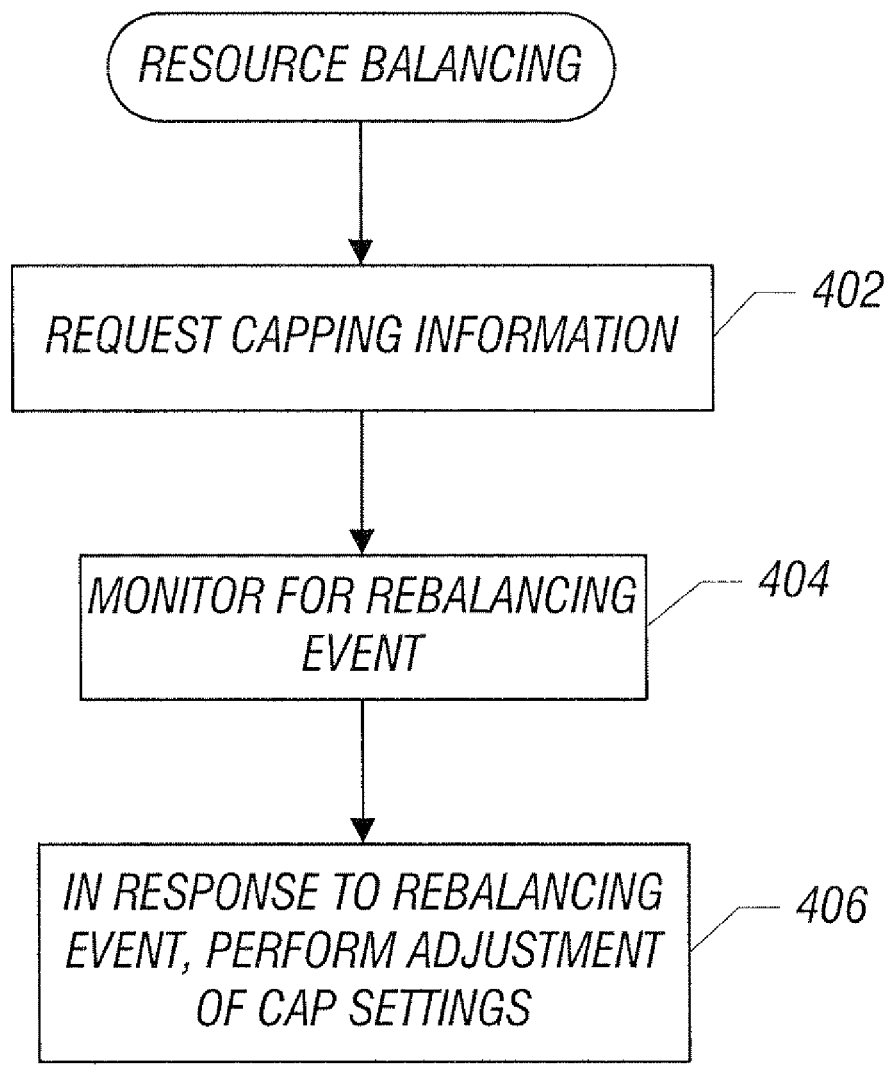
FIG. 4 is a flow diagram of a resource balancing procedure, according to an embodiment.

FIG. 4 shows a general resource balancing procedure used by some embodiments, as performed by the administrator 120. The cap setting control procedure of FIG. 3 is one example of the general resource balancing procedure, where the cap setting control procedure adjusts cap settings (to perform resource balancing) according to comparisons of current draws (power consumption) to cap settings. The resource balancing procedure also performs resource balancing in response to other rebalancing events.

The general resource balancing procedure begins by requesting (at 402) capping information from the server blades. The capping information can include capping capabilities of the server blades (whether or not corresponding server blades are able to support cap settings). The capping information also includes a current cap setting of the server blade.

Next, the resource balancing procedure monitors (at 404) for a rebalancing event. Rebalancing events can include any one or more of the following. A server blade may determine that its cap setting is insufficient, which has caused the server blade to reduce its operation (e.g., by reducing the number of tasks performed by the server blade, by performing clock throttling (e.g., by reducing clock frequency or reducing the clock duty cycle), or otherwise reducing operation of the server blade to allow the server blade to stay under the low cap setting). In response, the server blade may provide an indication to the administrator 120 that its cap setting is considered to be punitive. This indication is one example of a rebalancing event.

Another rebalancing event can be an indication that a server blade has just powered on (from a state where the server blade was using no power). Yet another rebalancing event includes a server blade being powered off from a state in which the server blade using some amount of power down to using no power.

Yet another rebalancing event includes indications of fan insertion or removal, or fan failure. Yet another rebalancing event can involve the removal or failure of a power supply.

Another rebalancing event is a detection that the current draw of a particular server blade reaches or comes close to the server blade's current cap setting, as discussed above in connection with FIG. 3.

In response to a rebalancing event, the resource balancing procedure performs rebalancing (at 406). The rebalancing may involve computations of new cap settings for the server blades in view of the particular rebalancing event.

Instructions of software described above (including administrator 120 of FIG. 1) are loaded for execution on a processor (such as one or more CPUs 122 in F*ig*. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in an electronic device enclosure, comprising:
   detecting a rebalancing event in the enclosure having a plurality of electronic devices, wherein the rebalancing event is selected from the group consisting of powering on of at least one electronic device, powering off of at least one electronic device, addition of at least one cooling device, removal of at least one cooling device, failure of at least one power device, and failure of at least one cooling device; and
   in response to the rebalancing event, adjusting cap settings of the electronic devices to perform resource balancing.

2. The method of claim 1, further comprising:
   measuring electrical current draws of corresponding electronic devices in the enclosure;
   determining if any of the electrical current draws causes power consumption of a particular one of the electronic devices to be within a predefined threshold of a cap setting of the particular electronic device; and
   in response to determining that the power consumption of the particular electronic device is within the predefined threshold of the cap setting of the particular electronic device, adjusting cap settings of the electronic devices to perform resource balancing.

3. The method of claim 1, wherein measuring the electrical current draws comprises measuring the electrical current draws using current sensors.

4. The method of claim 1, wherein adjusting the cap settings comprises adjusting electrical cap settings that specify maximum power consumption levels for respective electronic devices.

5. The method of claim 1, wherein adjusting the cap settings of the electronic devices comprises increasing a cap setting of a first of the electronic devices to account for increased workload at the first electronic device, and decreasing a cap setting of a second of the electronic devices to account for a reduced workload of the second electronic device.

6. The method of claim 1, wherein adjusting the cap settings causes adjustment of distribution of power to the electronic devices from a power subsystem in the enclosure.

7. The method of claim 1, wherein adjusting the cap settings causes re-distribution of cooling to different parts of the enclosure from a cooling subsystem.

8. The method of claim 1, wherein adjusting the cap settings of the electronic devices comprises adjusting the cap settings of servers.

9. The method of claim 1, wherein adjusting the cap settings comprises changing values in storage elements of corresponding electronic devices.

10. The method of claim 9, wherein changing the values in the storage elements of corresponding electronic devices comprises sending requests to the electronic devices to change the values.

11. An electronic device enclosure comprising:
a plurality of electronic devices;
a power subsystem; and
a controller to:
detect power consumptions of the electronic devices;
compare the power consumptions of the electronic devices to cap settings of the electronic devices;
in response to the comparison, adjusting at least one cap setting of at least one corresponding electronic device to perform balancing of usage of the power subsystem;
detect at least one other rebalancing event, wherein the rebalancing event is selected from the group consisting of powering on of at least one electronic device, powering off of at least one electronic device, addition of at least one cooling device, removal of at least one cooling device, failure of at least one power device, and failure of at least one cooling device; and
in response to the at least one other rebalancing event, adjust cap settings of the electronic devices to redistribute power from the power subsystem to the electronic devices.

12. The electronic device enclosure of claim 11, wherein the controller is configured to adjust the cap settings by: increasing a cap setting of a first of the electronic devices and decreasing a cap setting of a second of the electronic devices.

13. The electronic device enclosure of claim 11, further comprising:
a cooling subsystem, wherein adjustment of the cap settings causes redistribution of cooling from the cooling subsystem to different parts of the electronic device enclosure containing the corresponding electronic devices.

14. The electronic device enclosure of claim 11, wherein the electronic devices comprise servers.

15. The electronic device enclosure of claim 11, wherein each of the electronic devices includes a storage element to store a value representing the corresponding cap setting of the electronic device.

16. The electronic device enclosure of claim 11, wherein the comparing by the controller is to cause the controller to determine that the power consumption of a particular one of the electronic devices is within a predefined threshold of a cap setting of the particular electronic device, and wherein the adjusting of the at least one cap setting is in response to determining that the power consumption of the particular electronic device is within the predefined threshold of the cap setting of the particular electronic device.

17. An article comprising at least one computer-readable storage medium containing instructions that when executed cause a controller to:
detect a rebalancing event in an enclosure having a plurality of electronic devices, wherein the rebalancing event is selected from the group consisting of powering on of at least one electronic device, powering off of at least one electronic device, addition of at least one cooling device, removal of at least one cooling device, failure of at least one power device, and failure of at least one cooling device; and
in response to the rebalancing event, adjust cap settings of the electronic devices to perform resource balancing.

18. The article of claim 17, wherein adjusting the cap settings causes redistribution of power from a power subsystem to the electronic devices, and redistribution of cooling from a cooling subsystem to the electronic devices.

19. The article of claim 17, wherein the instructions when executed cause the controller to further:
receive indications of electrical current draws of the corresponding electronic devices;
determine if any of the electrical current draws causes power consumption of a particular one of the electronic devices to be within a predefined threshold of a cap setting of the particular electronic device; and
in response to determining that the power consumption of the particular electronic device is within the predefined threshold of the cap setting of the particular electronic device, adjust cap settings of the electronic devices to perform resource balancing.

* * * * *